(12) United States Patent
Vuggrala et al.

(10) Patent No.: US 11,595,231 B2
(45) Date of Patent: Feb. 28, 2023

(54) METRIC BASED DYNAMIC VIRTUAL PRIVATE NETWORK (VPN) TUNNEL BETWEEN BRANCH GATEWAY DEVICES

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/237,256

(22) Filed: Apr. 22, 2021

(65) Prior Publication Data
US 2022/0217015 A1 Jul. 7, 2022

(30) Foreign Application Priority Data
Jan. 7, 2021 (IN) .............................. 202141000675

(51) Int. Cl.
| | |
|---|---|
| H04L 12/46 | (2006.01) |
| H04L 43/08 | (2022.01) |
| H04L 41/5019 | (2022.01) |
| H04L 47/12 | (2022.01) |

(52) U.S. Cl.
CPC ...... H04L 12/4633 (2013.01); H04L 12/4641 (2013.01); H04L 41/5019 (2013.01); H04L 43/08 (2013.01); H04L 47/12 (2013.01)

(58) Field of Classification Search
None
See application file for complete search history.

(56) References Cited

U.S. PATENT DOCUMENTS

| | | | |
|---|---|---|---|
| 7,830,787 B1 | 11/2010 | Wijnands et al. | |
| 10,469,595 B2 | 11/2019 | Dawani et al. | |
| 2018/0241823 A1* | 8/2018 | Dawani | H04L 67/141 |
| 2018/0343146 A1* | 11/2018 | Dunbar | H04L 45/50 |
| 2019/0386918 A1 | 12/2019 | Iyer et al. | |

OTHER PUBLICATIONS

Cisco, "Cisco SD-WAN Cloud Scale Architecture," retrieved online Nov. 9, 2020, https://www.cisco.com/c/dam/en/us/solutions/collateral/enterprise-networks/sd-wan/nb-06-cisco-sd-wan-ebook-cte-en.pdf.
Hewlett Packard Enterprise Development LP, "Aruba SD-WAN Solution," User Guide, 2019, https://help.central.arubanetworks.com/2.4.9/documentation/online_help/content/pdfs/aruba_centraL_sd_wan_solution.pdf.

* cited by examiner

*Primary Examiner* — Christine T Duong
(74) *Attorney, Agent, or Firm* — Hewlett Packard Enterprise Patent Department

(57) ABSTRACT

Example implementation relates to a method for establishing a dynamic VPN tunnel between branch gateway devices based on metric data. A branch orchestrator receives metric data from VPNC device. The metric data includes data center bandwidth and processor utilization of the VPNC device. The metric data is derived from the traffic being routed via the VPNC device. When the metric data associated with traffic between a first branch gateway device and a second branch gateway device is above a Service Level Agreement (SLA), a dynamic branch to branch VPN tunnel is established to route the traffic between the first branch gateway device and the second branch gateway device. The VPN tunnel between the branch gateways can be teared when the load at the VPNC device reduces.

17 Claims, 7 Drawing Sheets

METRIC BASED DYNAMIC VIRTUAL PRIVATE NETWORK (VPN) TUNNEL BETWEEN BRANCH GATEWAY DEVICES

BACKGROUND

Wide Area Networks (WANs) allow enterprises to extend their networks over large distances by connecting branch networks to data centers in order to deliver applications and services required to perform a variety of functions An SD-WAN simplifies management and operation of the WAN by decoupling networking hardware from the control mechanism that handle network policies and determine availability of network bandwidth for appropriate routing of traffic. The SD-WAN matches the application requirements to the network bandwidth available at the branch network. Enterprises with large number of branch offices or sites connect the branch network to the data center using virtual private networks (VPNs) tunnels over internet. The traffic from client devices in the branch network are routed to concentrator devices in the data center using Internet Protocol Security (IPSec) based VPN tunnels.

With increasing number of branch offices communicating with the concentrator devices in data center, bandwidth consumption and resource utilization increases at the concentrator devices leading to higher cost in operation of the WAN. In addition, the concentrator devices may get overloaded leading to packet latency, drops, and jitter.

BRIEF DESCRIPTION OF THE DRAWINGS

The drawings provide examples and/or implementations consistent with the description; however, the description is not limited to the examples and/or implementations provided in the drawings.

DETAILED DESCRIPTION

Figure 1:
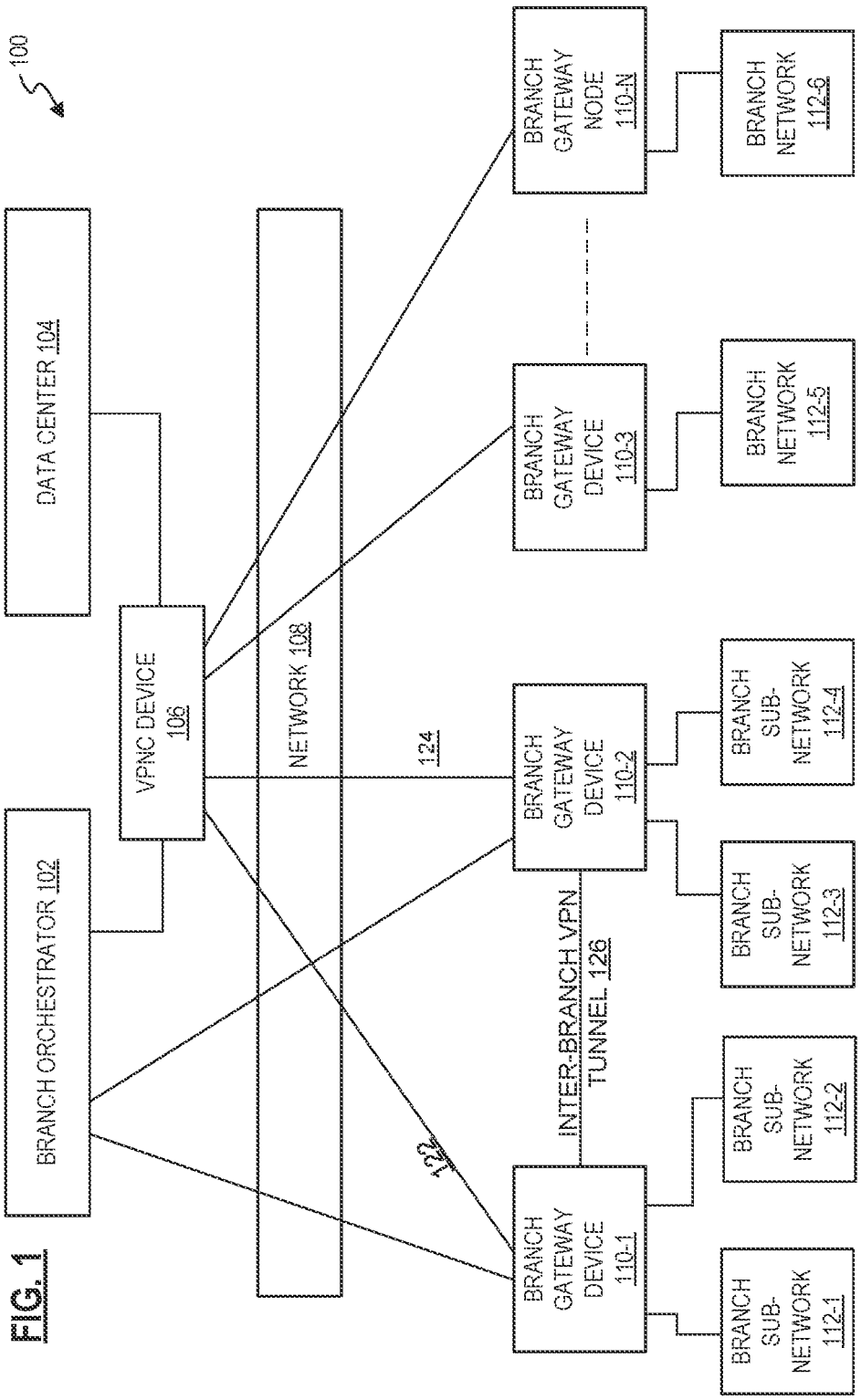
FIG. 1 illustrates an WAN architecture in which the branch orchestrator of the present disclosure may be implemented.

In several WAN implementations, multiple branch gateway devices in remote branch networks communicate securely with a central network device in a data center, for example, using a separate and secured tunnel that extends between each individual branch gateway device and the central network device. The traffic from the branch gateway devices is routed to the data center using the central network device over pre-configured Virtual Private Network (VPN) tunnel. The traffic between the remote branch networks may be routed via the central network device using dedicated VPN tunnels or routed via inter-branch VPN tunnels (branch to branch tunnel) between the branch gateway devices.

When the traffic between the branch gateway devices is routed via the central network device, the central network device may require additional compute power for processing the application data received from the branch gateway devices. Moreover, the central network device needs to perform cryptographic encryption and decryption twice. Once for traffic between the central networking device and the source branch gateway device and next for the traffic between the central networking device and destination branch gateways device. With larger distributed deployments, the additional bandwidth consumption, cryptographic overload and compute power required at the central network device increases the overall load at the central network device and cost of the maintaining the WAN.

In some implementations, the branch to branch VPN tunnels may be used for routing the traffic between the branch gateway devices. However, the branch to branch VPN tunnels are established statically or dynamically without considering overheads including orchestrating, rekeying, and liveliness checks. Moreover, if the traffic between the branch to branch VPN tunnels is not continuous, the creation and maintenance of these VPN tunnels may generate additional overhead at the data center. The branch to branch VPN tunnels in existing implementation are established for any destination branch gateway devices irrespective of the network traffic load from the branch gateway device. The VPN tunnels between branch gateway devices are established without considering the overhead of configuring and maintenance of the branch to branch VPN tunnels.

Systems and method are described herein for dynamically establishing a VPN tunnel between branch gateway devices. A branch orchestrator receives metric data from the VPN Concentrator (VPNC) device. The metric data includes data center bandwidth, a CPU utilization of the VPNC device, an application type of traffic, source and destination end points of routed traffic, and a cryptographic utilization of the VPNC device. The metric data is derived based on the traffic from the multiple gateway devices routed via the VPNC device. The branch orchestrator determines if the metric data associated with traffic between a first branch gateway device and a second branch gateway device is above a data center service level agreement (SLA). When the metric data is above the data center SLA, a VPN tunnel is dynamically established to re-route the traffic between the first branch gateway device and the second branch gateway device. When the load at the VPNC device reduces, the VPN tunnel is teared down and the traffic between the first branch gateway device and second branch gateway device is routed back via the VPNC device.

FIG. 1 illustrates a software-defined wide area network (SD-WAN) 100. The SD-WAN is a wide-area network (WAN) that has been implemented in software in which multiple branch gateway devices from multiple remote branch offices are connected to data center 104 using a VPNC device 106 (centralized network device) at the data center 104. The FIG. 1 shows multiple branch gateway devices 110-1, 110-2, 110-2, 110-3 . . . 110-N, hereinafter referred as branch gateway device(s) 110 communicating with the VPNC device 106. The branch gateway devices 110 may be a router, a digital-to-analog modem, a cable modem, a Digital Subscriber Line (DSL) modem, or some other network device.

The branch gateway devices 110 act as network end point devices to connect the client devices (e.g. laptops, smartphones, and Internet of things devices) at remote branch offices to data center 104 via the VPNC device 106 over the network 108. The data center 104 includes services and secure resources and may be installed at core sites (e.g. headquarters).

The network 108 may include public network (e.g. internet), Intranet, Local Area Network (LAN), Wide Area Network (WAN), and the like. Client devices (not shown) at multiple location can access the network 108 using the branch gateway devices 110. Examples of client devices may include: desktop computers, laptop computers, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Although, FIG. 1 depicts one VPNC device 106 and data center 104, it should be understood there may additional data centers and multiple VPNC devices for supporting the traffic received from the branch gateway devices 110.

The client devices may be connected to the branch gateway devices 110 via the branch networks or branch sub-nets (sub-network). The branch networks 112 and branch sub-networks 112 provide access to internet 108 to all the client devices in the remote branch offices.

The VPNC device 106 may be any hub type networking device used for establishing and configuring the VPN tunnels with the branch gateway devices 110 over the network 108. In an example, the VPNC device 106 may be a router device. In FIG. 1, the VPNC device 106 may be connected to a first branch gateway device 110-1 via a VPN tunnel 122 and the second branch gateway device 110-2 via VPN tunnel 124. The traffic between the first branch gateway device 110-1 and the second branch gateway device 110-2 is routed via the VPNC device 106. The VPN tunnels in the SD-WAN 100 may be established using a protocol (for example, Internet Protocol Security-IPsec).

The VPNC device 106 monitors all the network traffic received from the branch gateway devices 110 and determines metric data such as application type generating the traffic, the source and destination remote branch offices, bandwidth consumption of the VPNC device 106, and central processing unit (CPU) utilization of the VPNC device 106. The metric data may be derived from the traffic being routed via the VPNC device 106 in the data center 104. The metric data may be used for determining a VPNC load.

In an embodiment, the VPNC device 106 transmits the metric data associated with traffic between the branch gateway devices 110 to the branch orchestrator 102 when the VPNC device 106 load is high. In another embodiment, the transmission of metric data from the VPNC device 106 may be done at periodic intervals.

The branch orchestrator 102 monitors the received metric data from the VPNC device 106. The branch orchestrator 102 can include a software component that provides role based centralized configuration management and visibility. The branch orchestrator 102 may be present in a management device of the WAN 100 or present in a cloud system coupled to the WAN 100. The metric data comprises of data related to different parameters such as bandwidth consumption, resource utilization at VPNC device 106, the network end points (i.e. source and destination end points of packets).

When the load at the VPNC device 106 is high, the branch orchestrator 102 analyses the metric data associated with traffic between the branch gateway device(s) 110 to check if traffic between any specific branch gateway devices 110 is contributing to the traffic over load of the VPNC device 106. When the metric data associated with traffic between a first branch gateway device 110-1 and a second branch gateway device 110-2 is above the data center SLA, the branch orchestrator 102 dynamically establishes an branch to branch VPN tunnel 126 between the first branch gateway device 110-1 and the second branch gateway device 110-2 to re-route traffic between the first branch gateway device 110-1 and the second branch gateway device 110-2 via the VPN tunnel 126.

The branch to branch VPN tunnel 126 between the first branch gateway device 110-1 and the second branch gateway device 110-2 diverts the traffic away from the VPNC device 106 and reduces the load at the VPNC device 106.

When the load at the VPNC device 106 reduces, the branch orchestrator 102 may instruct the branch gateway devices (110-1 an 110-2) to delete the VPN tunnel 126 and use the VPN tunnels 122 and 124 to route the traffic between the branch gateway devices 110 via the VPNC device 106.

In some cases, when the metric data between the first branch gateway device 110-1 and the second branch gateway device 110-2 is below the SLA, the branch to branch VPN tunnel 126 is teared down and the traffic is routed back via the VPNC device 106.

Figure 2:
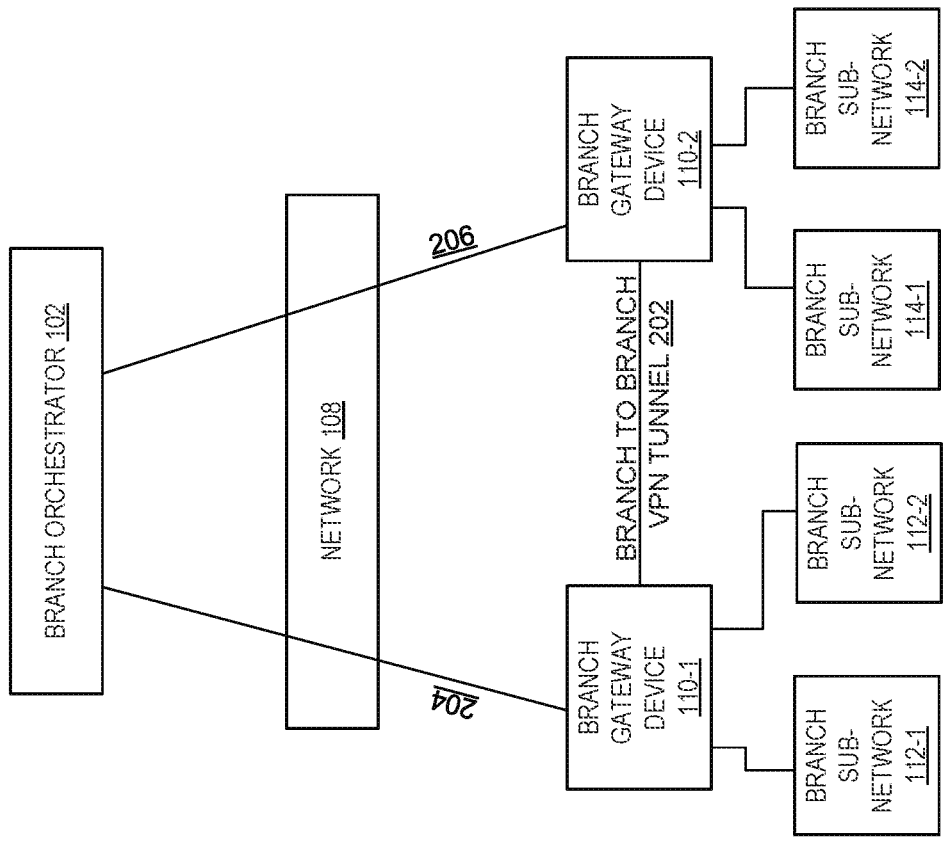
FIG. 2 is a block diagram of an Software Defined SD-WAN with a VPN tunnel established dynamically between the branch gateway devices, in accordance with the embodiments of the present disclosure.

FIG. 2 is a block diagram of the SD-WAN 100 in which a VPN tunnel 202 is dynamically established between the first branch gateway device 110-1 and the second branch gateway device 110-2 based on the metric data.

The metric data associated with the branch gateway devices 110 may be used by the branch orchestrator 102 to identify the branch gateway devices 110 with high traffic. When the metric data associated with the traffic between specific branch gateway devices 110 is above the data center SLA, a branch to branch VPN tunnel may be established between the specific branch gateway devices 110. The VPN tunnel is established dynamically based on monitoring of the metric data received from the VPNC device 106. The VPN tunnel automatically steers the traffic away from the VPNC device 106 for the specific branch gateway devices 110. This re-routing of traffic reduces the overall load at the VPNC device 106. Consider an example in which the client devices on branch sub-network 112-1 connected to the first branch gateway device 110-1 is communicating with client devices on branch subnetwork 112-3 connected to the second branch gateway device 110-2 via the VPNC device 106. When the metric data associated with traffic between the branch gateway devices 110-1 and 110-2 is above the SLA, the branch orchestrator 102 establishes a branch to branch VPN tunnel 202 to route the traffic between the first branch gateway device 110-1 and the second branch gateway device 110-2. The branch orchestrator 102 sends individual messages 204 and 206 to both the branch gateway devices 110-1 and 110-2 with details to establish the branch to branch VPN tunnel 202. When the VPN tunnel 202 is established, the client devices on branch sub-network 112-1 communicates with client devices on branch sub-network 112-3 via the VPN tunnel 202. The individual messages and details related to establishing the VPN tunnel are discussed in conjunction with FIGS. 4 and 5.

Figure 3:
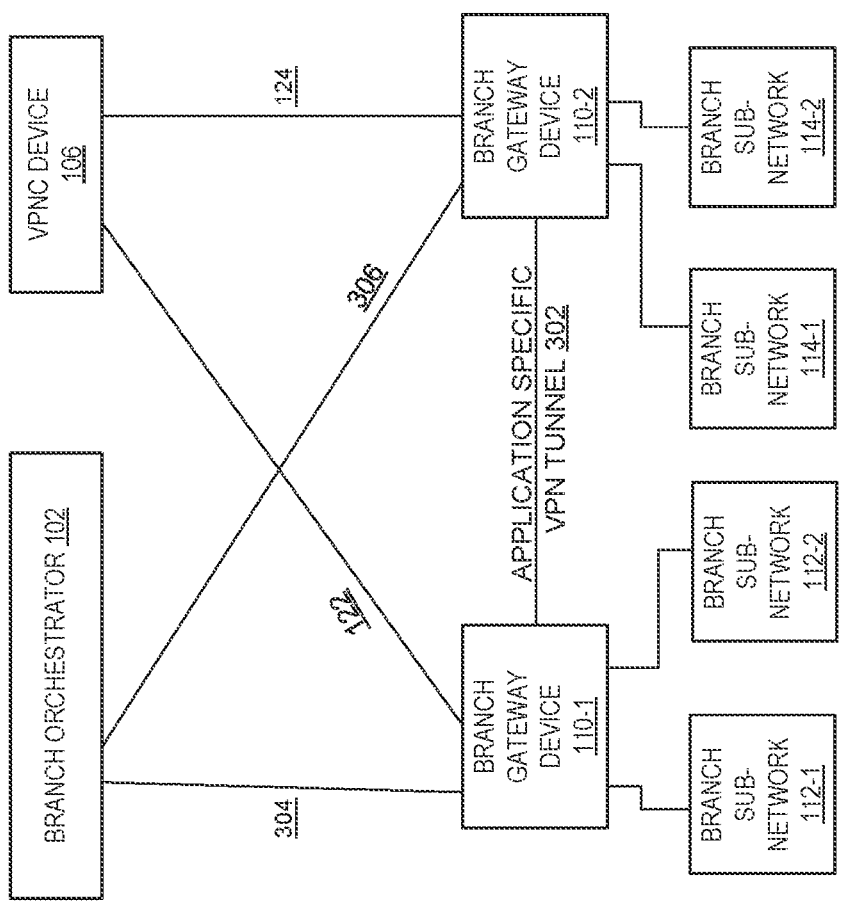
FIG. 3 is block diagram of the SD-WAN in which traffic is re-routed from the VPN concentrator (VPNC) device for specific applications, in accordance with the embodiments of the present disclosure.

FIG. 3 is block diagram of the SD-WAN 100 in which traffic is re-routed from the VPNC device 106 for specific applications, in accordance with the embodiments of the present disclosure. When traffic related to one particular application between two branch gateway devices 110 is high, a VPN tunnel is established for routing traffic associated with the application between the branch gateway devices 110. This reduces the load at the VPNC device 106.

For example, in FIG. 3 when an Voice over IP (VoIP) application being used for communication between client devices connected to the first branch gateway device 110-1 and client devices connected to second branch gateway device 110-2 may require high bandwidth to maintain Quality of Server (QoS) and generates high traffic at the VPNC device 106. The branch orchestrator 102 may provide instructions (304,306) to the first branch gateway device 110-1 and the second branch gateway device 110-2 to route traffic for the VoIP application over a branch to branch VPN tunnel 302 established between the first branch gateway device 110-1 and the second branch gateway device 110-2.

The traffic related to other applications, may be routed via the VPNC device 106 using existing VPN tunnels 122 and 124. The VPN tunnel 302 may be deleted once the traffic related to the application reduces or the load at VPNC device 106 reduces. This ensures that VPN tunnels are dynamically established only when required and deleted once the traffic ceases or load reduces at the VPNC device 106.

Figure 4:
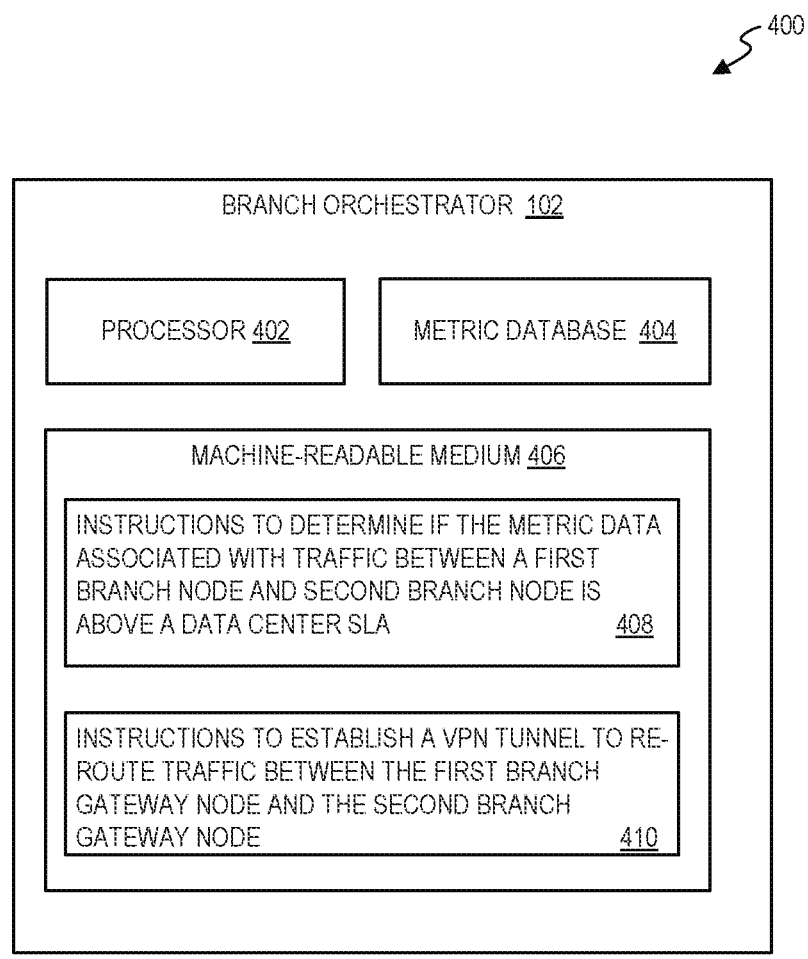
FIG. 4 is a block diagram of a branch orchestrator having a processor operably coupled to a machine-readable medium storing executable instructions, in accordance with the embodiments of the present disclosure.

FIG. 4 is a block diagram 400 of the branch orchestrator 102 having a processor operably coupled to a machine-readable medium 406 storing executable instructions, in accordance with the embodiments of the present disclosure. The branch orchestrator 102 may be present in a management device of the WAN 100 or present in a cloud system coupled to the WAN 100. The branch orchestrator 102 may communicate with other orchestrators in the cloud to set up the VPN tunnel, determine the best path and decide on the dynamic path steering policies. The branch orchestrator 102 may communicate with an Overlay Tunnel Orchestrator (OTO) to dynamically establish the VPN tunnel 126. In FIG. 1, the VPN tunnel 126 is established between the first branch gateway device 110-1 and second branch gateway device 110-2 is an Internet Protocol Security (IPsec) tunnel. However, other forms of the VPN tunnels may be employed.

The branch orchestrator 102 may communicate with an Overlay Route orchestrator (ORO) to set up a low cost route to reach clients in sub-networks behind the branch gateway devices 110 via the branch to branch VPN tunnel 126. The branch orchestrator 102 may communicate with a policy orchestrator to apply dynamic path steering policies for traffic flowing between the branch gateway devices 110.

The branch orchestrator 102 includes a processor(s) 402, a metric database 404, and a machine-readable medium 406. The processor 402 may be configured for monitoring the information stored in the metrics database 404 to dynamically establish VPN tunnels between the branch gateway devices 110. The VPN tunnels are established by dynamically based on the metric data monitored in real time.

The metric database 404 stores the metric data received from the VPNC device 106. The branch orchestrator 102 monitors the metric data stored in the metric data base 404 and analyzes the metric data to determine various parameters including applications causing traffic load at the VPNC device 106, bandwidth consumed by traffic routed between the branch gateway devices 110, and overall bandwidth utilization at the VPNC device 106. The load at the VPNC device 106 may be determined based on factors such as CPU utilization and cryptographic overhead.

The processor 402 may be configured to execute instructions (i.e. programming or software code) stored in the machine-readable medium 406 to perform the functions at the branch orchestrator 102 as described herein. For example, the machine-readable medium 406 may include instructions 408 to determine if the metric data associated with traffic between the first branch gateway device 110-1 and the second branch gateway device 110-2 is above the data center SLA.

When the metric data associated with the traffic between the first branch gateway device 110-1 and the second branch gateway device 110-2 is above the data center SLA, the instructions 410 may be executed which causes the processor 402 to send instructions to the branch gateway devices 110-1 and 110-2 for establishing the VPN tunnel 126 to re-route traffic between the first branch gateway device 110-1 and the second branch gateway device 110-2. To establish the VPN tunnel 126 between the branch gateways devices 110, the branch orchestrator 102 may send instructions to the branch gateway device 110 to establish VPN tunnel, and set up route and policies between the branch gateway devices 110. The SLA is a pre-defined value of a metric data defined for inter-branch traffic at the VPNC device 106. The SLA based pre-defined values between branches may be static. In some cases the SLA based pre-defined values may be dynamically generated using machine learning model.

Although FIG. 4 shows only two instructions, it should be understood that several instructions may be stored in the machine-readable medium 406.

Figure 5:
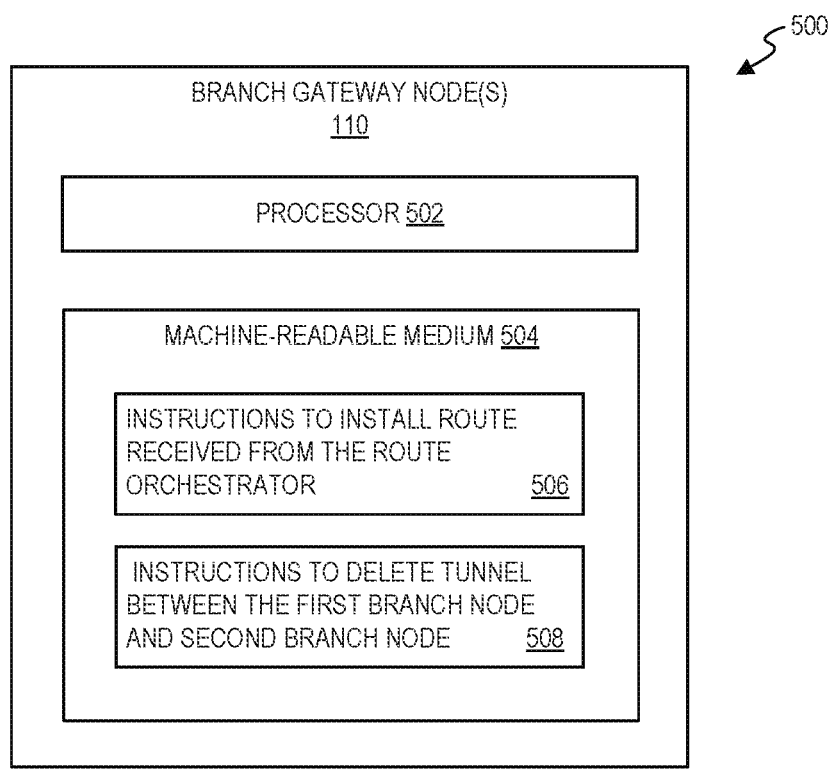
FIG. 5 is a block diagram of branch gateway device having a processor operably coupled to a machine readable medium storing executable program instructions, in accordance with embodiments of the present disclosure.

Referring now to FIG. 5, it depicts a block diagram 500 of branch gateway device 110, in accordance with embodiments of the present disclosure. The branch gateway device 110 includes a processor(s) 502, and a machine-readable medium 504. The processor 502 may be configured to execute instructions (i.e. programming or software code) stored in the machine-readable medium 504 to perform the functions at the branch gateway device 110 as described herein. For example, the machine-readable medium 504 may include instructions 506 to install route received from the branch orchestrator 102 in the routing table of the branch gateway devices 110. The route may be computed based on cost and location of the branch gateway devices 110.

In an embodiment, based on the instructions 506, the branch gateway device 110 may initiate Protocol Independent Multicast Protocol (PIM) join message to other branch gateway devices 110. In case of multicast traffic being sent from a first branch gateway device 110-1 to multiple other branch gateway devices 110, the first branch gateway device 110-1 may broadcast a PIM message to other branch gateway devices 110.

The machine-readable medium 504 may include instructions 508 to delete the branch to branch tunnel between the first branch gateway device 110-1 and the second branch gateway device 110-2. For example, when the load at the VPNC device 106 is low, VPN tunnel 126 is teared down. The traffic between the branch gateway devices is routed again via the VPNC device 106. In another example, when the traffic between the first branch gateway device 110-2 and second branch gateway device 110-2 is below the SLA, the VPN tunnel between the branch gateway devices 110 is deleted and traffic is routed back via the VPNC device 106. The dynamic creation and deletion of the branch to branch VPN tunnels ensures that minimum overhead is required to maintain information in cloud or the management device for the VPN tunnel.

Figure 6:
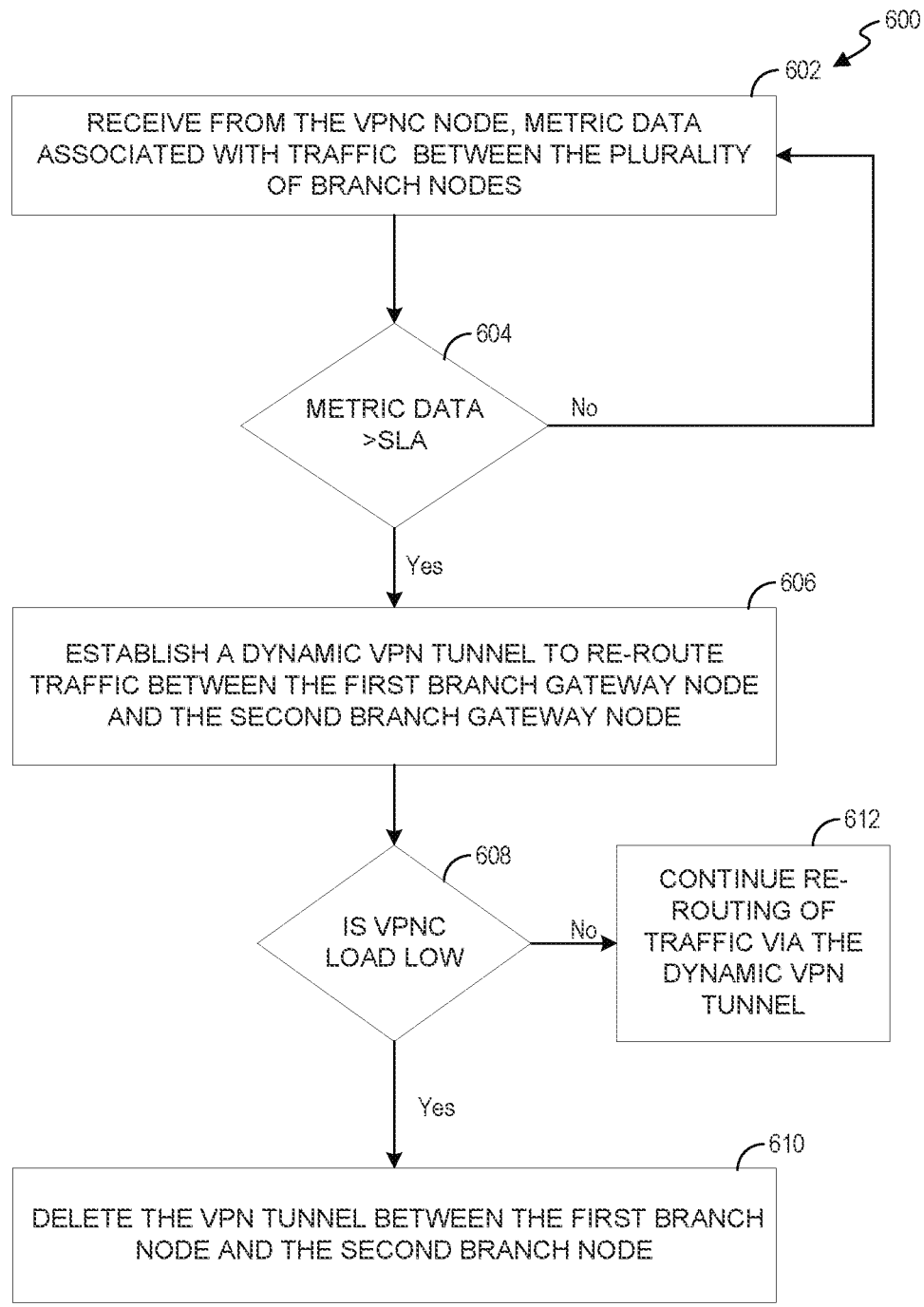
FIG. 6 is a flowchart depicting a method of creating branch to branch VPN tunnel dynamically based on metric data, in accordance to the embodiments of the present disclosure.

FIG. 6 is a flowchart depicting a method 600 of creating a branch to branch VPN tunnel dynamically based on metric data, in accordance to the embodiments of the present disclosure.

In some implementations, the methods 600 and 700 may include more or fewer blocks than are shown. In some implementations, blocks of the method may be combined. The method 600 and 700 shown in FIGS. 6 and 7 may be implemented in the form of executable instructions stored on a machine-readable medium 406 and executed by a processing circuitry (e.g. such as processor 402) and/or in the form of electronic circuitry in branch orchestrator 102.

The method 600 may start at block 602, with the branch orchestrator 102 monitoring the metric data received from the VPNC device 106. The metric data received is associated with all the traffic routed via the VPNC device 106, Additionally, the metric data includes application type generating the traffic, the traffic between branch gateway devices, bandwidth consumption at the VPNC device 106 in the data center 104 and the central processing unit (CPU) utilization of the VPNC device 106. The metric data is derived based on the traffic routed via the VPNC device 106. The VPNC device 106 transmits the metric data periodically to the branch orchestrator. In some implementations, the VPNC device 106 may transmit the metric data to the branch orchestrator 102 when the VPNC device 106 gets overloaded.

At block 604, the branch orchestrator 102 determines if the metric data associated with traffic between a first branch gateway device 110-1 and a second branch gateway device 110-2 is above the data center SLA.

The data center SLA is a pre-defined value associated with a metric data. The SLA may be defined for traffic between the branch gateway devices 110 by monitoring the metric data associated with traffic routed via the VPNC device 106.

At block 606, when the metric data associated with traffic between the first branch gateway device 110-1 and a second branch gateway device 110-2 is above the data center SLA, a VPN tunnel 126 is established dynamically to route traffic between the first branch gateway device 110-1 and a second branch gateway device 110-2.

At block 608, the branch orchestrator 102 monitors the received metric data and determines if load at the VPNC device 106 is low. At block 610, when the load at the VPNC device 106 is low, the VPN tunnel 126 established between the first branch gateway device 110-1 and the second branch gateway device 110-2 is deleted. The VPN tunnel is teared down and traffic between the first branch gateway device 110-1 and a second branch gateway device 110-2 is routed back via the VPNC device 106.

If the load of the VPNC device 106 is high, the re-routing of traffic continues using the VPN tunnel 126 at block 612.

As the branch to branch VPN tunnel is dynamically established and teared down based on the type and amount of traffic between branch gateway devices, the bandwidth and CPU related cost of the VPNC device 106 at the data center 104 can be reduced. Moreover, in comparison to maintaining a full-mesh (VPN tunnels) between all the branch gateway devices, several overheads including orchestrating, rekeying, and liveliness checks may be avoided.

Besides using the dynamic VPN tunnel for load reduction at the VPNC device, establishing dynamic VPN tunnel may assist in reducing the load at the VPNC device 106 for handling multicast traffic. The multicast traffic may be due to as video and audio conferencing applications, corporate messaging application in which a message is sent to multiple employees or any applications sending continuous data. For example, if an Voice over Internet Protocol (VoIP) server or an multicast Domain System (mDNS) server is behind one of the branch gateway device (source branch gateway device) and is communicating with multiple different branch gateway devices, the VPNC device 106 in the data center 104 receives the multicast data from the source branch gateway device and performs required cryptographic decryption before encrypting and transmitting the multicast data. The VPNC device needs to replicate the multicast data for each of the of the multiple different branch gateway devices leading to increase encryption/decryption overhead at the VPNC device and the overall data center 104 bandwidth consumption.

Figure 7:
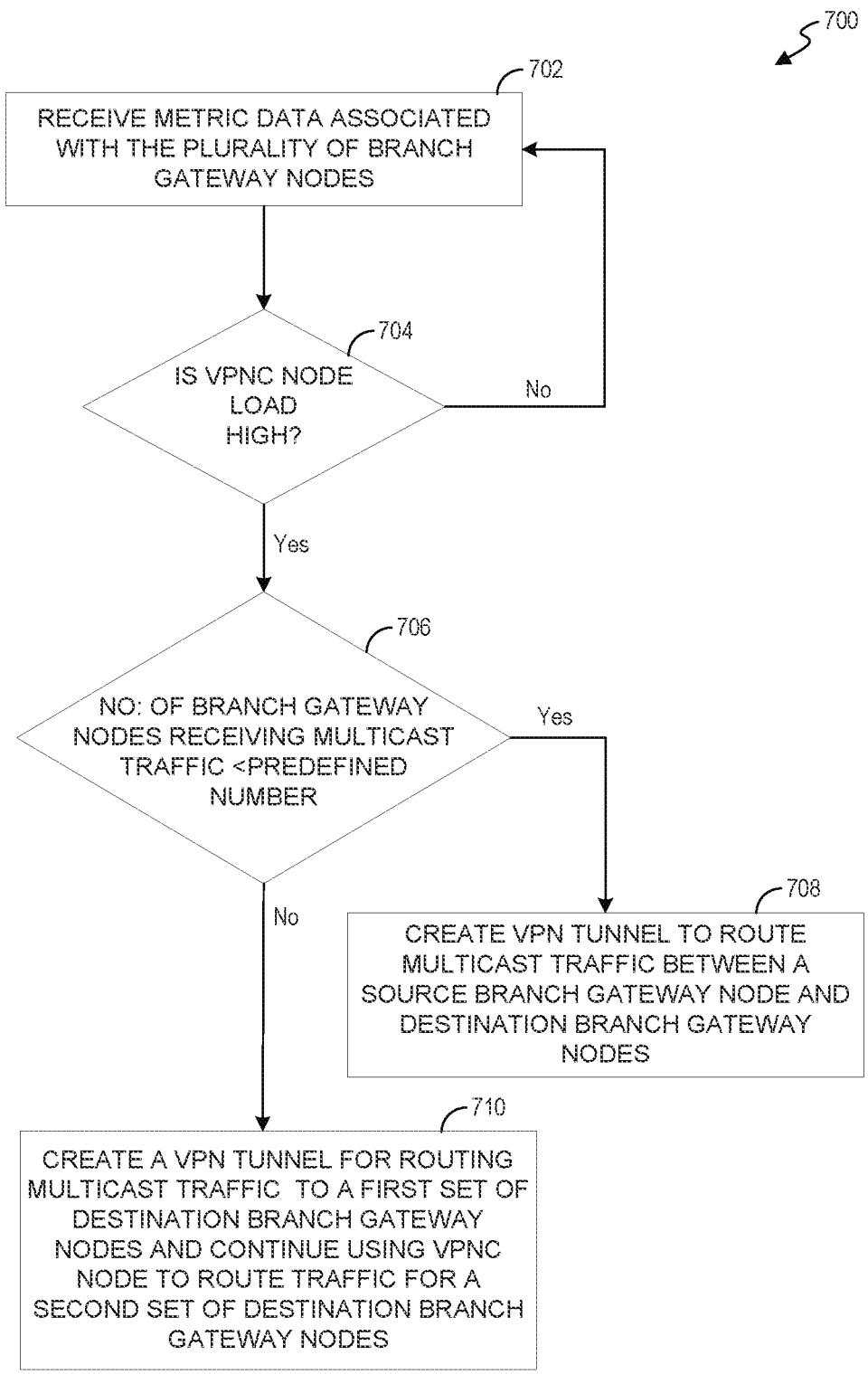
FIG. 7 is a flowchart depicting a method of establishing branch to branch VPN tunnels dynamically to manage multicast traffic received at the VPNC device, in accordance to the embodiments of the present disclosure.

FIG. 7 is a flowchart depicting a method 700 of creating branch to branch VPN tunnel dynamically to manage multicast traffic received at the VPNC device 106, in accordance to the embodiments of the present disclosure. The method 700 may begin at step 702, with the branch orchestrator 102 receiving metric data from the VPNC device 106. At step 704, based on the metric data associated with traffic routed via the VPNC device 106, the bandwidth consumption of the VPNC device 106, and the type of applications in routing traffic, the branch orchestrator 102 determines if the load at the VPNC device 106 is high.

At step 706, when the load at the VPNC device 106 is high and the VPNC device 106 is receiving multicast traffic, the branch orchestrator 102 determines the number of branch gateway devices 110 receiving multicast traffic via the VPNC device 106.

At step 708, when the number of branch gateway devices 110 receiving multicast traffic is below a pre-defined number, a VPN tunnel is established to route the multicast traffic between source branch gateway devices 110 and destination branch gateway devices 110.

At step 710, when the number of branch gateway devices 110 receiving multicast traffic is above the pre-defined number, a VPN tunnel is established to route the multicast traffic to a first set of destination branch gateway devices 110 from the source branch gateway device 110 and the traffic is routed via the VPNC device 106 for a second set of destination branch gateway devices 110 from the source branch gateway device. This type of distribution by establishing specific VPN tunnels to reduce the routing of traffic via VPNC device ensure a balanced approach to manage load at the VPNC device 106.

The load balancing at the VPNC device 106 may be done based on the metric data of traffic received from the branch gateway devices 110, the number of branch gateway devices 110 receiving multicast traffic, the number of branch gateway devices 110 communicating with other branch gateway devices 110, and application related traffic between the branch gateway devices 110.

The features of the present disclosure can be implemented using a variety of specific devices that contain a variety of different technologies and characteristics. As an example, features that include instructions to be executed by processing circuitry may store the instructions in a cache of the processor circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

The above description refers to the accompanying drawings. Wherever possible, the similar reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals In the foregoing description, numerous details are set forth to provide an understanding of the subject matter disclosed herein. However, implementation be practiced without some or all of these details. Other implementations may include modifications, combinations, and variations from the details discussed above. It is intended that the following claims cover such modifications and variations.

What is claimed is:

1. A method, comprising:
   receiving at a branch orchestrator, metric data derived from traffic associated with plurality of branch gateway devices routed via a virtual private network concentrator (VPNC) device, wherein the metric data comprises at least one of a data center bandwidth and a central processing unit (CPU) utilization of the VPNC device;
   determining if the metric data associated with traffic between a first branch gateway device and a second branch gateway device is above a data center service level agreement (SLA);
   in response to determining that the metric data associated with traffic between the first branch gateway device and the second branch gateway device is above a data center SLA, dynamically establishing a VPN tunnel to re-route traffic between the first branch gateway device and the second branch gateway device; and
   in response to determining that the CPU utilization of the VPNC device is low, deleting the VPN tunnel between the first branch gateway device and the second branch gateway device to route the traffic between the first branch gateway device and second branch gateway device via the VPNC device.

2. The method of claim 1, wherein establishing the VPN tunnel between the first branch gateway device and the second branch gateway device comprises of setting up a low cost route between client subnets of the first branch gateway device and the client subnets of the second branch gateway device.

3. The method of claim 1, wherein establishing the VPN tunnel between the first branch gateway device and the second branch gateway device comprises of applying dynamic path steering policies for the traffic between the first branch gateway device and the second branch gateway device.

4. The method of claim 1, wherein establishing the VPN tunnel between the branch gateway devices comprises:
   re-routing traffic associated with a specific application over the VPN tunnel between the first branch gateway device and the second branch gateway device; and
   continuing routing traffic associated with other applications via the VPNC device.

5. The method of claim 1, wherein the metric data comprises at least one of an application type of traffic, source and destination end points of routed traffic, and a cryptographic utilization of the VPNC device.

6. The method of claim 1, wherein the service level agreement (SLA) is a pre-defined value of the metric data.

7. The method of claim 1, wherein the VPN tunnel is an IPsec Tunnel forwarding data between subnets of the branch gateway devices.

8. A software-defined wide-area network (SD-WAN) comprising:
   a branch orchestrator; and
   a virtual private network concentrator (VPNC) device transmitting metric data to the branch orchestrator, wherein the metric data is derived from traffic associated with a plurality of branch gateway devices routed via the VPNC device, and wherein the metric data comprises at least one of a data center bandwidth and a central processing unit (CPU) utilization of the VPNC device,
   wherein the branch orchestrator dynamically establishes a VPN tunnel to re-route traffic between a first branch gateway device and a second branch gateway device when the metric data associated with traffic between the first branch gateway device and a second branch gateway device is above a data center service level agreement (SLA); and
   wherein the branch orchestrator deletes the VPN tunnel between the first branch gateway device and the second branch gateway device to route the traffic between the first branch gateway device and second branch gateway device via the VPNC device when the CPU utilization of the VPNC device is low.

9. The SD-WAN of claim 8, wherein dynamically establishing the VPN tunnel between the second branch gateway device and the first branch gateway device comprises of setting up a low cost route to reach client subnets in the first branch gateway device and the second branch gateway device.

10. The SD-WAN of claim 8, wherein dynamically establishing the VPN tunnel between the second branch gateway device and the first branch gateway device comprises of applying dynamic path steering policies for the traffic between the second branch gateway device and the first branch gateway device.

11. The SD-WAN of claim 8, wherein the branch orchestrator re-routes traffic associated with a specific application over the VPN tunnel between the first branch gateway device and the second branch gateway device and continues routing traffic associated with other applications via the VPNC device.

12. The SD-WAN of claim 8, wherein the metric data comprises at least one of an application type of traffic, source and destination end points of routed traffic, and a cryptographic utilization of the VPNC device.

13. The SD-WAN of claim 8, wherein the data center service level agreement (SLA) is a pre-defined value for the metric data.

14. The SD-WAN of claim 8, wherein the VPN tunnel is an IPsec Tunnel forwarding data between subnets of the second branch gateway device and the subnets of the first branch gateway device.

15. A non-transitory machine-readable storage medium comprising instructions, the instructions executable by a processor of a branch orchestrator to:

receive metric data derived from traffic associated with plurality of branch gateway devices routed via a virtual private network concentrator (VPNC) device, wherein the metric data comprises at least one of a data center bandwidth and a central processing unit (CPU) utilization of the VPNC device;

determine if the metric data associated with traffic between a first branch gateway device and a second branch gateway device is above a service level agreement (SLA);

in response to determining that the metric data associated with traffic between the first branch gateway device and the second branch gateway device is above the data center SLA, dynamically establish a VPN tunnel to re-route traffic between the first branch gateway device and the second branch gateway device; and in response to determining that the CPU utilization of the VPNC device is low, deleting the VPN tunnel between the first branch gateway device and the second branch gateway device to route the traffic between the first branch gateway device and second branch gateway device via the VPNC device.

16. The non-transitory computer machine-readable storage medium of claim 15, wherein the service level agreement (SLA) is a pre-defined value for the metric data.

17. The non-transitory computer machine-readable storage medium of claim 15, wherein the metric data comprises at least one of an application type of traffic, source and destination end points of routed traffic, and a cryptographic utilization of the VPNC device.

* * * * *